United States Patent
Shirasawa

(10) Patent No.: US 8,045,222 B2
(45) Date of Patent: Oct. 25, 2011

(54) IMAGE PROCESSING METHOD, IMAGE PROCESSING APPARATUS, COMPUTER PROGRAM PRODUCT, AND RECORDING MEDIUM FOR IMAGE PROCESSING

(75) Inventor: Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 723 days.

(21) Appl. No.: 11/802,736

(22) Filed: May 24, 2007

(65) Prior Publication Data

US 2008/0007806 A1  Jan. 10, 2008

(30) Foreign Application Priority Data

Jun. 30, 2006  (JP) ................. 2006-180756

(51) Int. Cl.
*H04N 1/60* (2006.01)

(52) U.S. Cl. ......... 358/1.9; 358/518; 358/520; 358/521; 358/523; 382/167

(58) Field of Classification Search ............. 358/1.9, 358/518–523; 382/167
See application file for complete search history.

(56) References Cited

U.S. PATENT DOCUMENTS

| | | | |
|---|---|---|---|
| 5,539,540 A | | 7/1996 | Spaulding et al. |
| 5,615,312 A * | | 3/1997 | Kohler ............ 358/1.9 |
| 5,661,575 A * | | 8/1997 | Yamashita et al. ....... 358/519 |
| 5,689,590 A | | 11/1997 | Shirasawa et al. |
| 5,793,501 A * | | 8/1998 | Murakami ............ 358/520 |
| 6,128,022 A * | | 10/2000 | Dillinger ............ 345/591 |
| 6,137,595 A | | 10/2000 | Sakuyama et al. |
| 6,226,011 B1 | | 5/2001 | Sakuyama et al. |
| 6,297,826 B1 * | | 10/2001 | Semba et al. ............ 345/589 |
| 6,839,460 B2 | | 1/2005 | Shirasawa |
| 6,859,551 B2 * | | 2/2005 | Ohga ............ 382/167 |
| 6,995,865 B1 * | | 2/2006 | Motomura ............ 358/1.9 |
| 7,072,084 B2 * | | 7/2006 | Shirasawa ............ 358/525 |
| 7,072,507 B2 * | | 7/2006 | Ohga ............ 382/164 |
| 7,177,465 B1 * | | 2/2007 | Takahira ............ 382/166 |
| 7,397,588 B2 * | | 7/2008 | Sloan et al. ............ 358/520 |
| 7,403,205 B2 * | | 7/2008 | Zeng ............ 345/590 |
| 7,564,604 B2 * | | 7/2009 | Shirasawa ............ 358/529 |
| 2004/0126009 A1 | | 7/2004 | Takenaka et al. |
| 2005/0089221 A1 | | 4/2005 | Shirasawa |
| 2006/0120598 A1 * | | 6/2006 | Takahashi et al. ............ 382/167 |
| 2006/0192878 A1 | | 8/2006 | Miyahara et al. |
| 2006/0203270 A1 | | 9/2006 | Shirasawa |
| 2007/0013927 A1 | | 1/2007 | Miyahara et al. |

FOREIGN PATENT DOCUMENTS

| | | |
|---|---|---|
| JP | 6-253138 A | 9/1994 |
| JP | 09-018727 | 1/1997 |
| JP | 09-168097 | 6/1997 |
| JP | 10-084487 | 3/1998 |
| JP | 2000-184221 | 6/2000 |
| JP | 2001-094799 | 4/2001 |
| JP | 3337697 | 8/2002 |
| JP | 2002-262120 | 9/2002 |
| JP | 2003-143425 | 5/2003 |
| JP | 2004-032140 | 1/2004 |
| JP | 2004-104777 | 4/2004 |

* cited by examiner

*Primary Examiner* — King Poon
*Assistant Examiner* — Richard Zhu
(74) *Attorney, Agent, or Firm* — Dickstein Shapiro LLP

(57) ABSTRACT

An image processing apparatus converts an input color signal into a color signal which falls within a color reproduction range of an image output device. The image processing apparatus includes a representative color setting unit that sets plural representative colors, a first hue setting unit that sets hue for an equi-hue line connecting the representative color and black, a hue correcting unit that corrects hue of the input color signal referring to the first hue setting unit, and a mapping unit that maps the input color signal after whose hue is corrected to a color signal within a color range of the image output device.

18 Claims, 15 Drawing Sheets

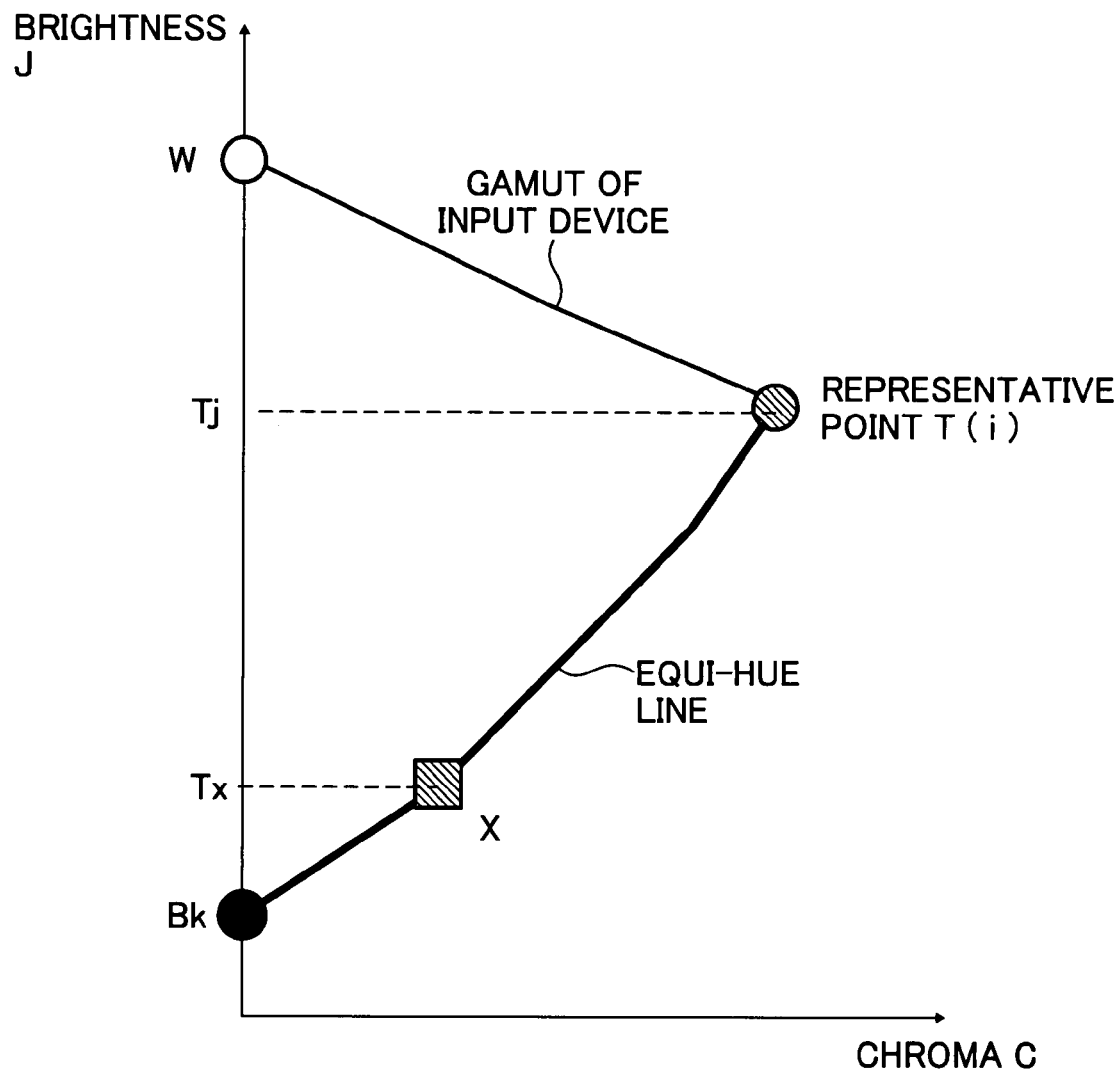

RGB ⇒ HLS
MAX = max (R, G, B)
MIN = min (R, G, B)
L = (MAX + MIN) / 2
IN CASE WHERE MAX=MIN
S = 0
H = 0
IN CASE OTHER THAN CASE WHERE MAX=MIN $$S = \begin{cases} (MAX-MIN) / (MAX \div MIN) & L \leq 0.5 \\ (MAX-MIN) / (2-MAX-MIN) & L > 0.5 \end{cases}$$

Cr = (MAX-R) / (MAX-MIN)
Cg = (MAX-G) / (MAX-MIN)
Cb = (MAX-B) / (MAX-MIN)

$$H = \begin{cases} Cb - Cg & R = MAX \\ 2 + Cr - Cb & G = MAX \\ 4 + Cg - Cr & B = MAX \end{cases}$$

H = 60 x H
H = H + 360   H < 0

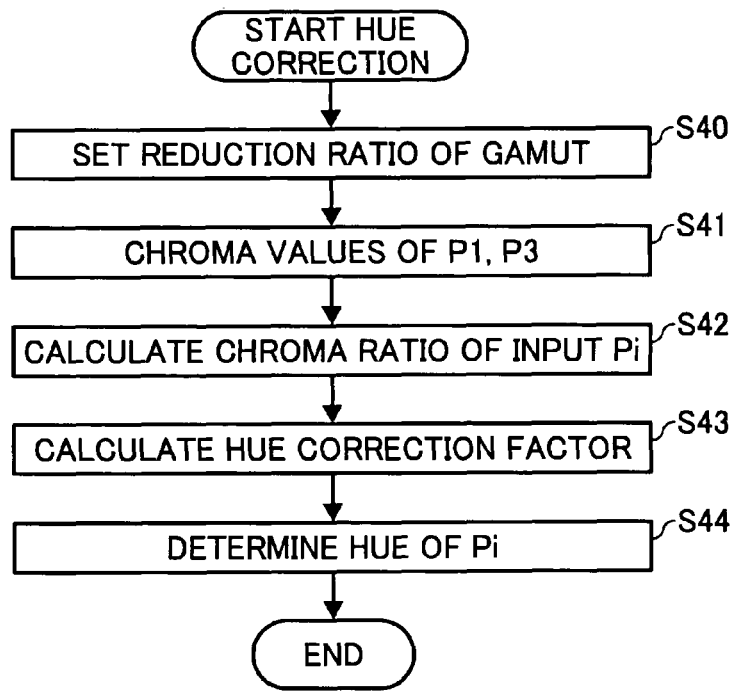
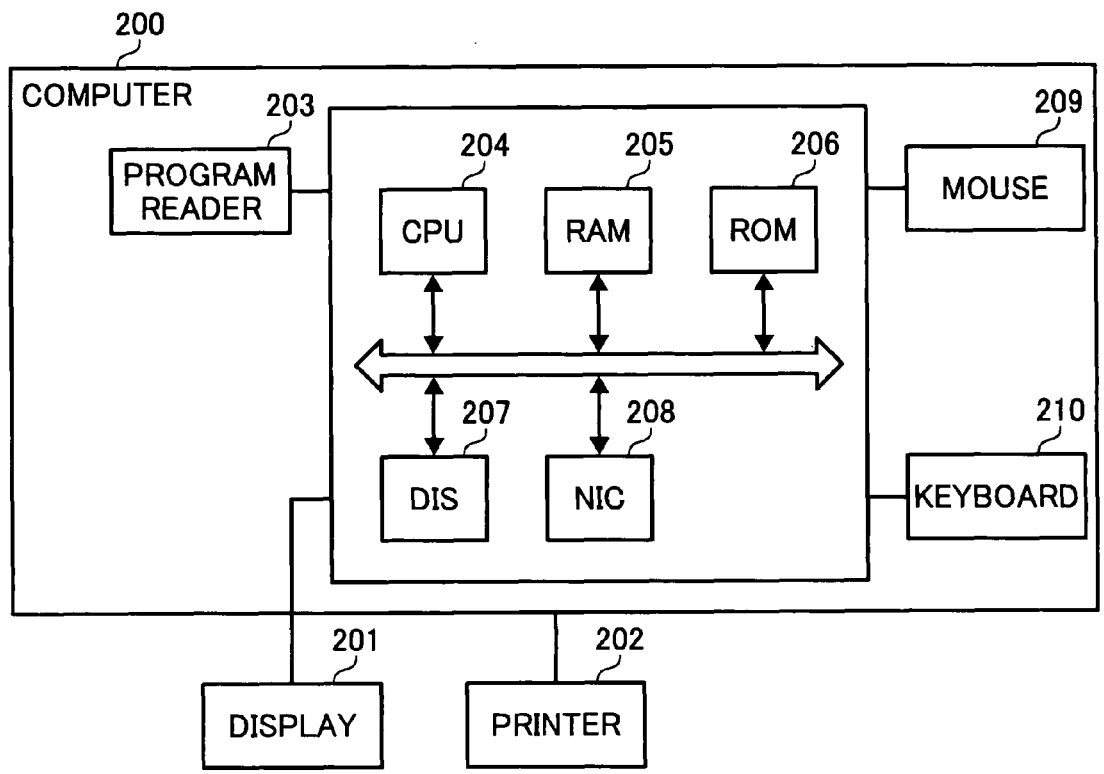

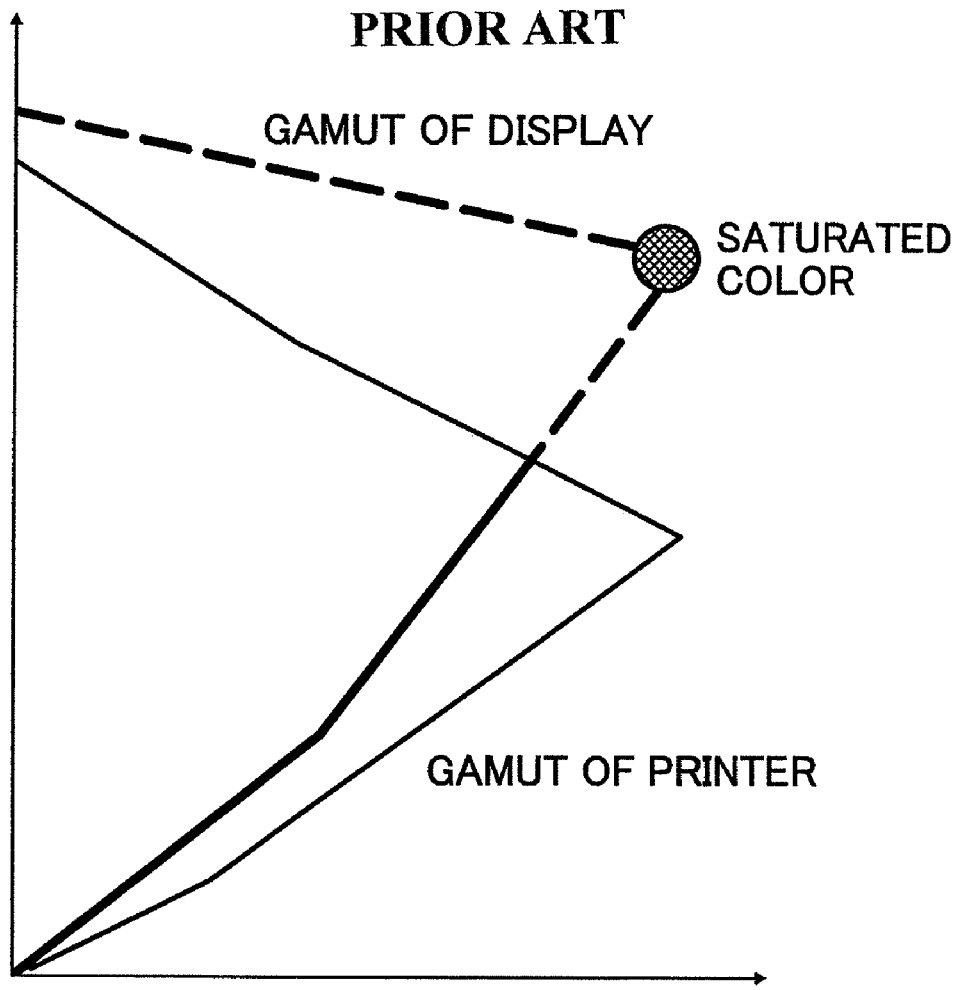

IMAGE PROCESSING METHOD, IMAGE PROCESSING APPARATUS, COMPUTER PROGRAM PRODUCT, AND RECORDING MEDIUM FOR IMAGE PROCESSING

CROSS-REFERENCE TO RELATED APPLICATIONS

The present document incorporates by reference the entire contents of Japanese Priority document, 2006-180756 filed in Japan on Jun. 30, 2006.

BACKGROUND OF THE INVENTION

1. Field of the Invention

The present invention relates to an image processing method, an image processing apparatus, a computer program product for image processing, and a recording medium for image processing. More specifically, the present invention relates to an image processing technique for converting color image information of an input system into color image information that falls within a color reproduction range of an output system when the color-reproduction range of the input device is different from the color reproduction range of the output device. More specifically, the present invention relates to a suitable technique for color-image output device such as a color facsimile, a color printer, and a color copier, and software for generating a color-conversion parameter employed in the image output device.

2. Description of the Related Art

Display devices such as Cathode Ray Tube (CRT) and printing devices such as printers are known as devices that output color images. These devices, however, are known to have differences in reproducible color range due to differences in manner of output. When a user tries to output images using different output devices based on identical image data, e.g., when the user tries to print an image created on a CRT using a printer, some colors may not be reproduced. Therefore, when the color image is handled on plural devices, color conversion processing called "gamut processing" is required. The "gamut processing" is a technique for mapping input color-image signals to colors reproducible in the output device.

One of the gamut processing techniques is described in Japanese Patent Application Laid-Open No. H10-84487. According to this technique, colors represented by the input color signals but irreproducible in the output device are reproduced as colors whose color difference with the original color is minimum and which is reproducible by the output device. The color difference is calculated based on difference in brightness, saturation, and hue with the use of various weights.

According to another known technique, a target projection point is set on an achromatic axis or on a chromatic axis which has the same hue as the hue of an input color signal. Then, the hue of out-of-gamut colors, i.e., colors which fall out of the gamut of the output device, is set to a fixed value and the out-of-gamut colors are subjected to compression mapping to the gamut of the output device (see Japanese Patent Application Laid-Open Nos. H9-168097 and H9-18727, for example).

When the compression mapping is performed in the gamut processing on the hue plane of the same hue as that of the input color signal as described above, hue distortion in Lab space makes blue color reproduced as violet color. A technique described in Japanese Patent No. 3337697 intends to solve this problem by defining a nonlinear line for each hue and performing the gamut processing using the nonlinear lines.

Further, as described in Japanese Patent Application Laid-Open Nos. 2000-184221, 2002-262120, and 2003-143425, it is possible to perform the conversion of an input signal value into an output signal value by first performing hue conversion and then mapping the brightness and the chroma at a hue angle obtained by the hue conversion. Further, according to a technique described in Japanese Patent Application Laid-Open No. 2001-94799, an input signal value is first converted (compressed) into a value within an intermediate mapping color reproduction range, and the converted value is further converted (expanded) into an output signal value. According to this technique, (nonlinear) brightness range adjustment, hue angle conversion, and chroma conversion are performed first, and then the brightness is mapped onto an output color reproduction range in a nonlinear manner.

The conventional gamut processing as described above have various problems in terms of optimal color control. The technique described in Japanese Patent Application Laid-Open No. H10-84487 is advantageous in that the color shift in the color reproduction processing is trivial since the mapping direction is switched to a direction where the hue difference is the least based on the shape of the color reproduction range. According to this technique, however, since the mapping direction depends on the shape of the color reproduction range of the output system, the continuity in the mapping direction sometimes cannot be maintained. As a result, continuous input colors may be mapped to discontinuous colors in various mapping directions, causing degradation in image quality such as collapse of gradation, and gradation jump.

The technique described in Japanese Patent No. 3337697 is advantageous in that the mapped hue is more acceptable for the human perception in comparison with the hue obtained in the hue-fixed gamut processing in the Lab space as in the Japanese Patent Application Laid-Open Nos. H9-168097 and H9-18727 since the nonlinear lines are set for chroma-based correction of hue distortion. However, this technique basically intends to perform compression mapping to the same hue of the input color signal. Therefore, the shape of the gamut of the printer is not taken into consideration in determining the reproduced hue.

Contrary to the above-mentioned techniques, the techniques described in Japanese Patent Application Laid-Open Nos. 2000-184221, 2002-262120, 2003-143425, and 2001-94799 take into consideration the shape of the gamut of the printer in determining the reproduced hue of a specific color and control the entire hue in line with the reproduced hue of the specific color. These techniques are advantageous in that colors can be reproduced more clearly than in mapping of the saturated colors of the primary and the secondary colors onto colors of the same hue, and that a reproduced color can be more close to the expectation of the user. These techniques, however, perform the identical hue conversion to the colors on the same hue plane or of the same saturation. Therefore, though the hue continuity is easily maintained, the colors for which no hue correction is required are also corrected.

The above problem will be described in more detail. FIG. 19 is a graph of a relation between a gamut of a display and a gamut of a printer for a cyan hue. In FIG. 19, the colors represented by a portion surrounded by a dotted line cannot be reproduced by a printer, and therefore need to be mapped to reproducible colors. When the above-described technique is employed, the color reproduction can be achieved with a minimum color shift particularly with respect to the saturated colors. However, colors other than the saturated colors are all reproduced in the same hue as the hue of the saturated colors. Therefore, the color shift becomes highly noticeable. The colors represented by a bold line in FIG. 19 are examples of colors to which the hue correction is performed even though these colors are reproducible in the printer. Particularly in a shadow area, the reproduced colors are largely different from colors shown on the display.

The technique of Japanese Patent Application Laid-Open No. 2001-94799 can control the hue angle more subtly than the techniques mentioned above since this technique employs a hue mapping function that corresponds to the brightness. However, since the (nonlinear) brightness range adjustment, the hue angle conversion, and the brightness conversion are performed independently of each other, the input color signal is sometimes converted into an unintended printer output color, and sometimes the gradation jump cannot be suppressed. Further, when the adjustment of hue angle is desired, the hue mapping function must be corrected for each level of brightness in consideration of continuity. Thus, the color adjustment becomes complicated.

As described above, the color gamut processing according to the conventional techniques has difficulties in performing appropriate hue control in such a manner that the hue continuity and constancy in appearance are maintained for continuous colors ranging from white, a specific color, and to black. For example, when the hue of the primary cyan color of the display is shifted for reproduction to a preferable color, the hue of the intermediate colors placed between the cyan and black is also shifted even when these colors are reproducible in the printer.

SUMMARY OF THE INVENTION

It is an object of the present invention to at least partially solve the problems in the conventional technology. In particular, the present invention has at least following objects.

Firstly, an object of one aspect of the present invention is to provide an image processing apparatus, an image processing method, and a computer program product for image processing, according to which colors can be reproduced with little color shift while the hue continuity is maintained. Such color reproduction is achieved particularly with respect to colors frequently used in business documents, such as colors ranging from white to a representative color, and colors ranging from the representative color to black.

Further, an object of another aspect of the present invention is to provide an image processing apparatus which can reproduce colors with smooth hue change particularly with respect to colors ranging from the representative color to black.

Still further, an object of still another aspect of the present invention is to provide an image processing apparatus which can perform color reproduction in such a manner that a color shift in shadow color is not noticeable without compromising color reproducibility of the representative color.

Still further, an object of still another aspect of the present invention is to provide an image processing apparatus which can perform optimal hue control of each reproduced color.

Still further, an object of still another aspect of the present invention is to provide an image processing apparatus which causes little color shift for colors ranging from the representative color to white.

Still further, an object of still another aspect of the present invention is to provide an image processing apparatus which can adjust the hue of reproduced colors which correspond to colors on the equi-hue lines connecting the representative color and black and the representative color and white in a precise manner.

Still further, an object of still another aspect of the present invention is to provide a unit that automatically creates a hue correction table in accordance with the shape of the gamut of an output device.

Still further, an object of still another aspect of the present invention is to provide an image processing apparatus which can create a high-quality hue correction table.

Still further, an object of still another aspect of the present invention is to provide a unit that corrects the hue of input colors, which cannot be reproduced by the output device, in an appropriate manner, and that performs highly precise faithful color conversion of input colors which can be reproduced by the output device.

Still further, an object of still another aspect of the present invention is to provide an image processing apparatus which does not cause sudden change in hue near the boundary of the color reproduction range of the output device.

An image processing apparatus according to one aspect of the present invention converts an input color signal into a color signal which falls within a color reproduction range of an image output device. The image processing apparatus includes a representative color setting unit that sets plural representative colors, a first hue setting unit that sets hue for an equi-hue line connecting the representative color and black, a hue correcting unit that corrects hue of the input color signal referring to the first hue setting unit, and a mapping unit that maps the input color signal after whose hue is corrected to a color signal within a color range of the image output device.

An image processing method according to another aspect of the present invention is a method for converting an input color signal into a color signal which falls within a color reproduction range of an image output device. The image processing method includes setting plural representative colors, setting a first hue for an equi-hue line connecting the representative color and black, correcting hue of the input color signal referring to the first hue set, and mapping the input color signal after whose hue is corrected to a color signal within a color range of the image output device.

A computer program product according to still another aspect of the present invention causes a computer to perform the image processing method according to the present invention.

A computer usable recording medium according to still another aspect of the present invention causes a computer to perform the image processing method according to the present invention.

According to some aspects of the present invention, color range mapping can be performed in such a manner that the colors obtained as a result of color reproduction show smooth hue change corresponding to colors ranging from the representative color to black.

According to still another aspect of the present invention, since the hue setting unit corrects the hue so that the hue changes from the hue of the corresponding color to the hue of the representative color, the color reproduction with excellent color continuity can be performed for colors in the neighborhood of the representative color.

According to still another aspect of the present invention, since the hue setting unit can set the hue correction table independently for each representative color, optimal hue correction can be performed for each color.

According to still another aspect of the present invention, since the colors on the equi-hue line connecting the representative color and white are corrected to the same hue as the hue of the representative color, color reproduction can be performed with little color shift for the gradation of colors ranging from white to a saturated color, for which color shift is particularly noticeable.

According to still another aspect of the present invention, the hue of the reproduced colors can be adjusted precisely particularly for colors on the equi-hue lines connecting the representative color and black, and the representative color and white.

According to still another aspect of the present invention, since the hue setting unit has a unit that finds corresponding colors corresponding to plural points on the line and a unit that creates the hue correction table based on the relation between the hue of the plural points and the corresponding colors, appropriate hue correction table can be created efficiently for various output devices.

According to still another aspect of the present invention, since the evaluation equation based on the visual experiment is used to determine the corresponding color on the line, the color reproduction can be performed close to the expected color, even when the expected colors corresponding to the plural points on the line are different from the colors with minimum color difference.

According to still another aspect of the present invention, since the color range in which the hue correction is not performed can be set, the hue correction can be properly performed for an input color which cannot be reproduced in the output device while highly precise faithful color conversion can be performed for an input color which can be reproduced in the output device.

According to still another aspect of the present invention, since the color range in which the hue correction is not performed is set to a range obtained by reducing the color reproduction range of the image output device, smooth gradation reproduction can be performed without sudden hue change in the neighborhood of the boundary of the color reproduction range of the output device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a graph of an equi-hue line;

FIG. 17 is a flowchart of hue correction according to the fourth embodiment;

FIG. 18 is a block diagram of an exemplary configuration to realize the present invention using software; and FIG. 19 is a graph for explaining problems in conventional techniques.

DETAILED DESCRIPTION OF THE PREFERRED EMBODIMENTS

Exemplary embodiments of the present invention will be described in detail below with reference to the accompanying drawings.

First Embodiment

Basic Technique for Performing Gamut Mapping Using Hue Correction

1. Overall Configuration of Image Processing System

Figure 1:
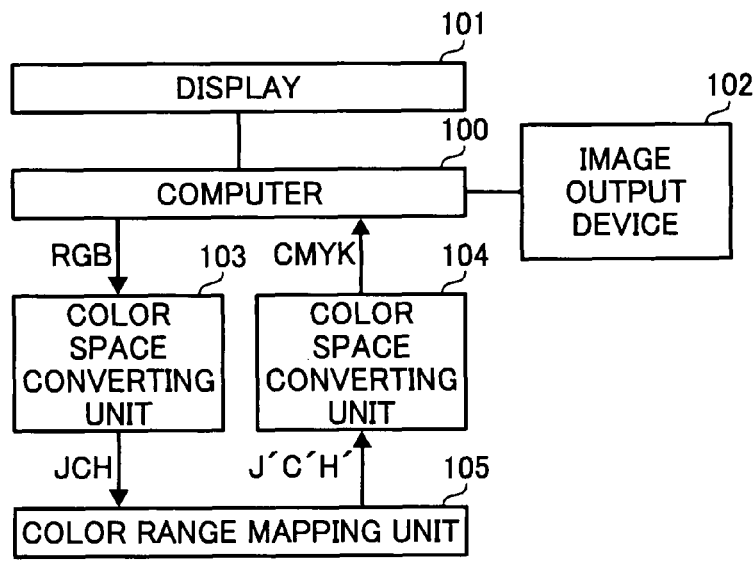
FIG. 1 is a block diagram of an image processing system according to a first embodiment of the present invention.

FIG. 1 is a block diagram of an image processing system according to one embodiment of the present invention. In FIG. 1, 100 is a computer, 101 is a display, 102 is an image output device, 103 and 104 are color space converting units, and 105 is a color range mapping unit. The image processing system shown in FIG. 1 includes the computer 100, the display 101 and the image output device 102 both connected to the computer 100, the color space converting unit 103 which serves to convert device-specific color signals (RGB signals) supplied from the computer 100 into device-independent color signals suitable for processing in the color range mapping unit 105, the color space converting unit 104 which serves to convert output results of the color range mapping unit 105 into color signals (CMY signals, CMYK signals, or the like) specific to the image output device 102, and the color range mapping unit 105. The image output device 102 is an output device that prints out image data. The image output device 102 is, for example, an image forming device such as a color printer and a color facsimile.

2. Operation of Image Processing System

The computer 100 outputs image data in the computer, so that the image output device 102 prints out the image data. The image data is usually a color signal consisting of color components of R (red), G (green), and B (blue) to be displayed on a monitor. The RGB signals are transmitted from the computer 100 to the color space converting unit 103 and converted into color signals to be processed in the color range mapping unit 105. The color signals processed in the color range mapping unit 105 can be any color signals as far as they have color components corresponding to brightness, chroma, and hue, as color signals in compliance with CIECAM02 standardized according to CIE, for example. In the first embodiment, the color space converting unit 103 converts the input RGB signal into a color signal Pi(j,c,h) which is in compliance with brightness J, chroma C, and hue H of the CIECAM02, and outputs the resulting color signal to the color range mapping unit 105.

Since the signal Pi(j,c,h) is a color signal generated from the RGB color signal, the signal Pi(j,c,h) as it is contains a color signal which cannot be reproduced by the image output device 102. The color range mapping unit 105 converts the signal Pi(j,c,h) into a color signal Po(j',c',h') which is reproducible by the image output device 105 in a manner described later. The color space converting unit 104 converts the signal Po(j',c',h') supplied from the color range mapping unit 105 into a color signal such as a CMY signal or a CMYK signal which can be processed by the image output device 102. Then, the color space converting unit 104 transmits the resulting signal to the computer 100. When the color signal obtained as a result of processing and conversion mentioned above is transmitted to the image output device 102, printing is performed.

In the exemplary configuration shown in FIG. 1, independent units from the computer 100 and the image output device 102 perform the color space conversion and the color range mapping. A unit which performs the color space conversion and the color range mapping, however, may be incorporated in the computer 100 or in the image output device 102. Further, the above-described process can be executed by software. For example, a printer driver stored in the computer 100 as a program can serve to execute the above-described process.

3. Overall Configuration of Color Range Mapping Unit 105

Figure 2:
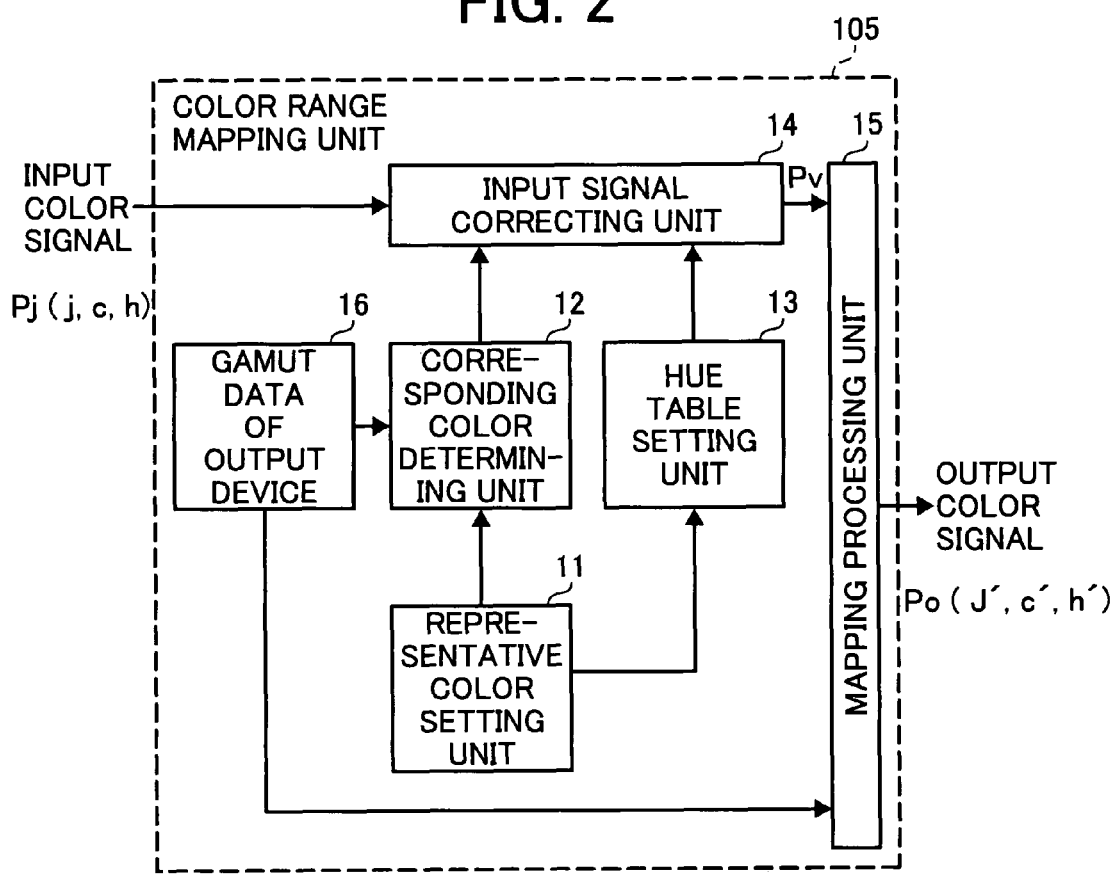
FIG. 2 is a block diagram of a color range mapping unit according to the first embodiment of the present invention.

FIG. 2 is a block diagram of an overall configuration of the color range mapping unit 105 according to the first embodiment of the present invention. The color range mapping unit 105 includes a representative color setting unit 11, a corresponding color determining unit 12, a hue table setting unit 13, an input signal correcting unit 14, a mapping processing unit 15, and gamut data 16 of an output device.

4. Operation of Color Range Mapping Unit 105

The representative color setting unit 11 and the hue table setting unit 13 set a representative color T(i) and a hue correction table Table(i) corresponding to an equi-hue line connecting the representative color T(i) and black. The representative color is a color which is designated by the color signal transmitted from the computer 100 and for which color reproduction control is particularly desirable. The representative color can be a predetermined color, or may be optionally set by the user. Generally, a color with the maximum chroma (such as R, G, B, C, M, and Y) in the RGB space is set as the representative color. The hue correction table is a table employed for performing hue correction on the equi-hue line connecting the representative color and black. In the hue correction table, a hue correction factor is set corresponding to a position on the equi-hue line, for example.

The corresponding color determining unit 12 determines a corresponding color which corresponds to the set representative color. The corresponding color is an output color of the output device corresponding to the representative color. The process performed by the corresponding color determining unit 12 is a process to find a color reproducible in the output device. When the representative color setting unit 11 designates a representative color T, the corresponding color determining unit 12 calculates a color signal M(jm,cm,hm) which corresponds to the representative color T and which falls within the color reproduction range of the output device, referring to the gamut data 16 of the output device.

The input signal correcting unit 14 calculates a corrected input signal Pv(jv,cv,hv) based on the input color signal Pi(j,c,h) sent from the color space converting unit 103 by correcting the brightness, hue, and chroma of the input color signal Pi referring to the corresponding color of the representative color and the hue correction table. Finally, on receiving the corrected input signal Pv(jv,cv,hv), the mapping processing unit 15 calculates the output color signal Po(j',c',h') referring to the gamut data 16 of the output device and supplies the output color signal Po(j',c',h') to the color space converting unit 104.

The gamut data 16 of the output device can be such gamut data which designates maximum chroma Cmax corresponding to the hue H and the brightness J as proposed in Japanese Patent Application Laid-Open 2002-262120.

5. Detailed Description of Components of Color Range Mapping Unit 105

(1) Representative Color Setting Unit 11

The representative color setting unit 11 sets the representative color T(i) for which particular stress is placed on color reproduction. The representative color is set by designating the values of the input RGB signal. When the user designates the representative color, a dialogue screen may be displayed to facilitate the setting. When the representative color is not specifically set, saturated colors of a primary color and a secondary color of R, G, B, C, M, and Y frequently used in business documents are employed as the representative colors. When the input RGB signal values are quantized in eight bits, six representative colors are: R(255,0,0), G(0,255,0), B(0,0,255), C(0,255,255), M(255,0,255), and Y(255,255,0). The saturated colors are, colors for which the RGB signal value is (255,0,x), (0,x,255), or the like (here, x means "don't care").

Figure 3:
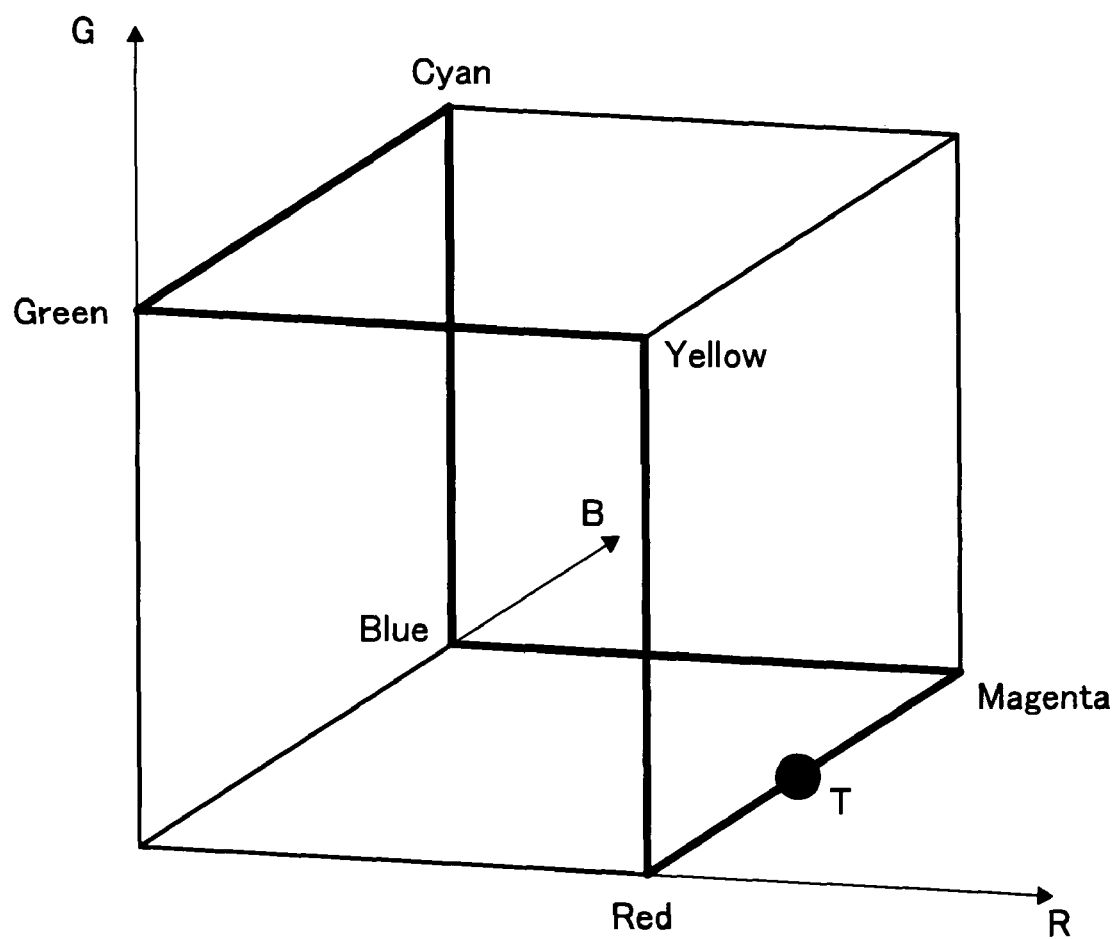
FIG. 3 is a diagram for explaining a representative color.

Colors other than the above-mentioned six colors may be set as the representative colors. Basically, however, it is desirable that the colors located on edges indicated by a bold line in FIG. 3 be designated.

When the representative colors are set, the representative color setting unit 11 calculates JCH values of the representative color which is set in RGB in compliance with the CIECAM02. The conversion from the RGB signal into the JCH signal can be performed through the RGB→XYZ conversion based on conversion equations standardized according to IEC61966-2-1 and the subsequent use of XYZ→JCH conversion equations. The XYZ→JCH conversion is detailed in a technical report of CIE159-2004 and the description thereof is not given here. When the characteristic of the RGB signal of the input device is other than that of sRGB signal, the RGB→XYZ conversion is performed according to specific color characteristic.

(2) Corresponding Color Determining Unit 12

Figure 4A:
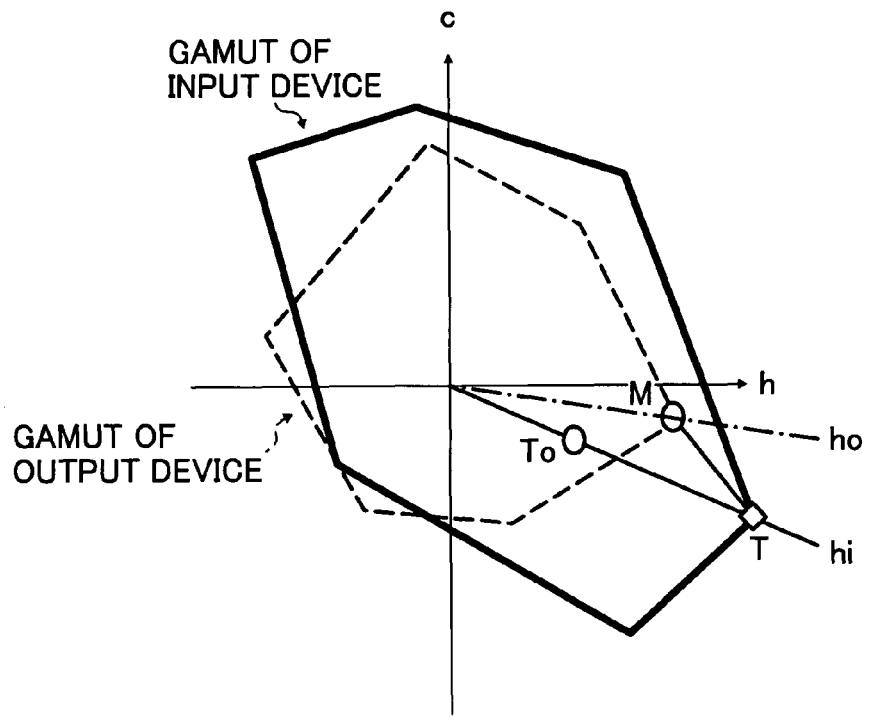
FIG. 4A is a graph for explaining a relation between the representative color and a corresponding color.
Figure 4B:
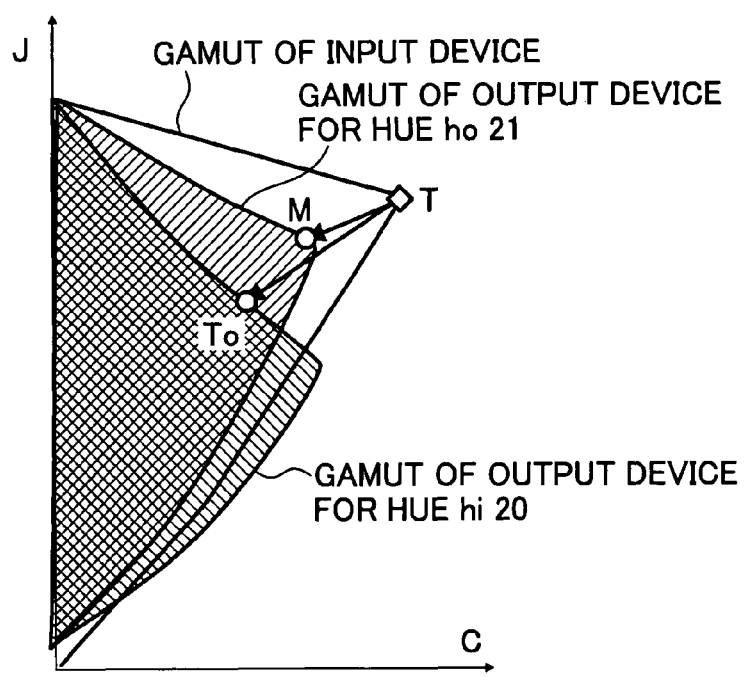
FIG. 4B is a graph for explaining a relation between the representative color and a corresponding color.

When the representative color is determined, the corresponding color determining unit 12 determines a corresponding color M(i) corresponding to the representative color T(i). FIGS. 4A and 4B are graphs illustrating one example of correspondence between the representative color T(i) and the corresponding color M(i). In FIGS. 4A and 4B, 21 is a gamut of the output device for hue ho. Since the relation between the corresponding color M and the representative color T is a three-dimensional positional relation and cannot be shown in one drawing, a relation graph of the chroma c and the hue h is shown in FIG. 4A and a relation graph of the brightness j and the chroma c is shown in FIG. 4B. In FIG. 4B, a gamut 20 of the output device for the hue hi is overlapped with the gamut 21 for the hue ho in the same two-dimensional plane. Further, a mapped color To which is obtained through the mapping of the representative color T when the hue is set to a fixed value is shown for comparison.

Among the color signals contained in the gamut of the output device, a color which has a minimum color difference with the representative color T(i) is set as the corresponding color M(i) corresponding to the representative color T(i). When the corresponding color is determined in such a manner, the hue of the representative color and the hue of the corresponding color do not match with each other.

For example, as shown in FIGS. 4A and 4B, of the mapped color To with the hue hi, which is the same hue as the hue of the representative color T, and the corresponding color M with the hue ho, the corresponding color M is clearly closer to the representative color T. Such a phenomenon is caused partly by the fact that the shape of the gamut of the image output device is highly complicated and that the shape of the gamut largely differs for each hue. When the representative color is significantly off from the color reproduction range of the output device, the color reproduction can often be achieved with little color change when the mapping is performed on a slightly different hue rather than when the mapping is performed on the same hue.

The color difference is generally represented by a Euclidean distance in the JCH space. The manner of representation of the color difference, however, is not limited thereto. For example, a color reproduction evaluation equation may be formulated based on visual experiments. The corresponding color M may be found based on the color reproduction evaluation equation so that the optimal color reproduction can be performed. Further, if the user is not happy with the corresponding color automatically found as described above, the user may directly set the corresponding color. For example, if the user wants to reproduce yellow or magenta in a clear primary color or a secondary color in the printer, the user can directly designate the corresponding color.

(3) Hue Table Setting Unit 13

The hue table setting unit 13 sets the hue correction table according to which the hue successively changes from the hue ht(i) of the representative color T(i) to the hue hm(i) of the corresponding color M(i) corresponding to the equi-hue line connecting the representative color T(i) and black. In the first embodiment, a line connecting the representative color (representative point) and black in the input color space as indicated by a bold line in FIG. 5 is employed as the equi-hue line. On the other hand, no hue correction table is set for a line connecting the representative color and white, and the colors represented by such a line are always reproduced in the same hue as the hue of the corresponding color.

Figure 6A:
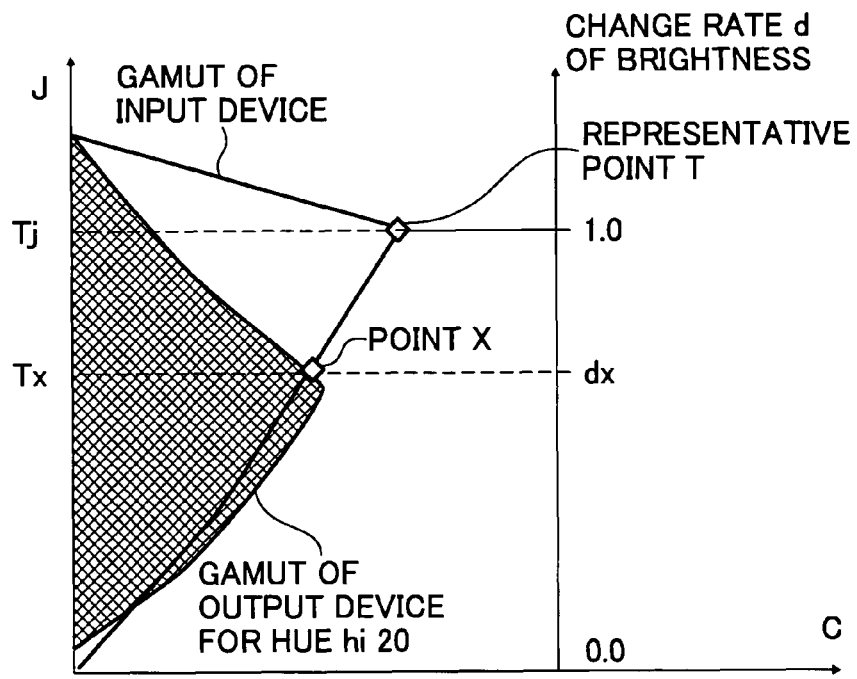
FIG. 6A is a graph for explaining a relation between a hue correction table and a color reproduction range.
Figure 6B:
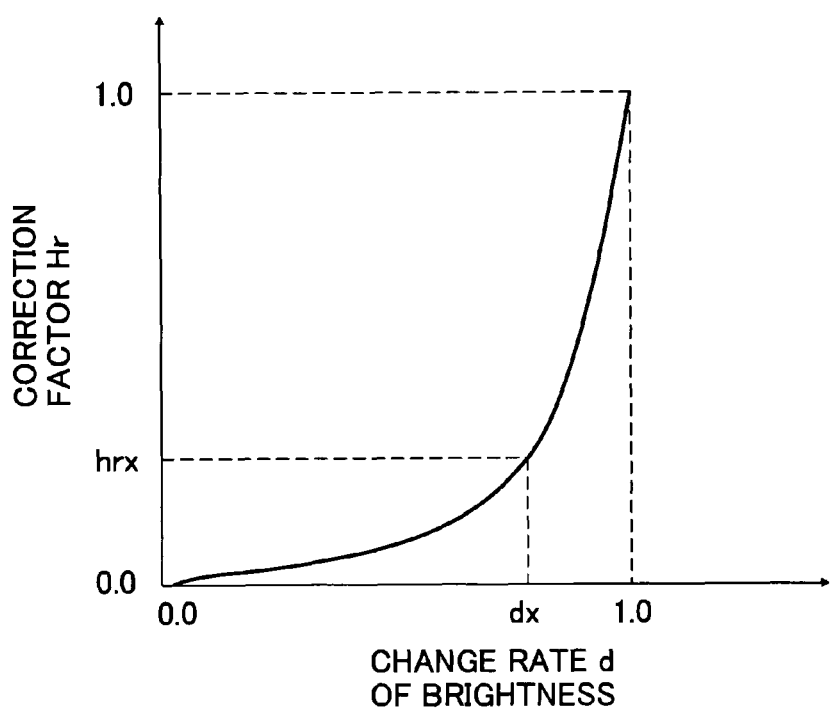
FIG. 6B is a graph for explaining a relation between the hue correction table and the color reproduction range.

FIGS. 6A and 6B are graphs of a relation between the equi-hue line and the hue correction table. As shown in FIG. 6B, the hue correction table is given in the form of the hue correction factors corresponding to the change rate d of the brightness J.

For example, when a point on the line connecting the representative point (representative color) and black is indicated by X, the brightness of the point X by Tx, the brightness of the representative point by Tj, and the brightness of the black point by 0, the change rate dx of brightness of the point X can be defined as:

$$dx=Tx/Tj.$$

The hue correction factor indicates the rate of internal division of the hue of the representative point and the hue of the corresponding point. For example, if the hue correction factor is 0, the correction is performed in the same hue as the representative point. When the hue correction factor is 1, the correction is performed in the same hue as the corresponding point. In the example of FIG. 6A, the hue correction factor corresponding to the change rate dx is represented as hrx. In this case, the hue hx of the reproduced color corresponding to the input color X is represented by a following equation:

$$hx=(hm-ht)*hrx+ht.$$

Here, ht is the hue of the representative color, and hm is the hue of the corresponding color.

It is desirable that the hue does not change as much as possible for the faithful color reproduction with respect to an area 20 of the equi-hue line included in the color reproduction range of the output device. Therefore, the hue correction factor for the area 20 included in the color reproduction range of the output device is set to a number as close to zero as possible. As a result, a nonlinear conversion table as shown in FIG. 6B is employed as the hue correction table.

The hue correction table mentioned above does not need to be the same for plural lines connecting the representative colors and black. The user can set the hue correction tables independent from each other. Alternatively, the hue correction table may be set automatically corresponding to the hue of the representative color and the corresponding color. In the example described above, the hue correction table is set in a form of a look up table. The form of the hue correction table is not limited thereto, and the hue correction table can be set as a conversion function of quadratic expression, for example.

(4) Input Signal Correcting Unit 14

Figure 7:
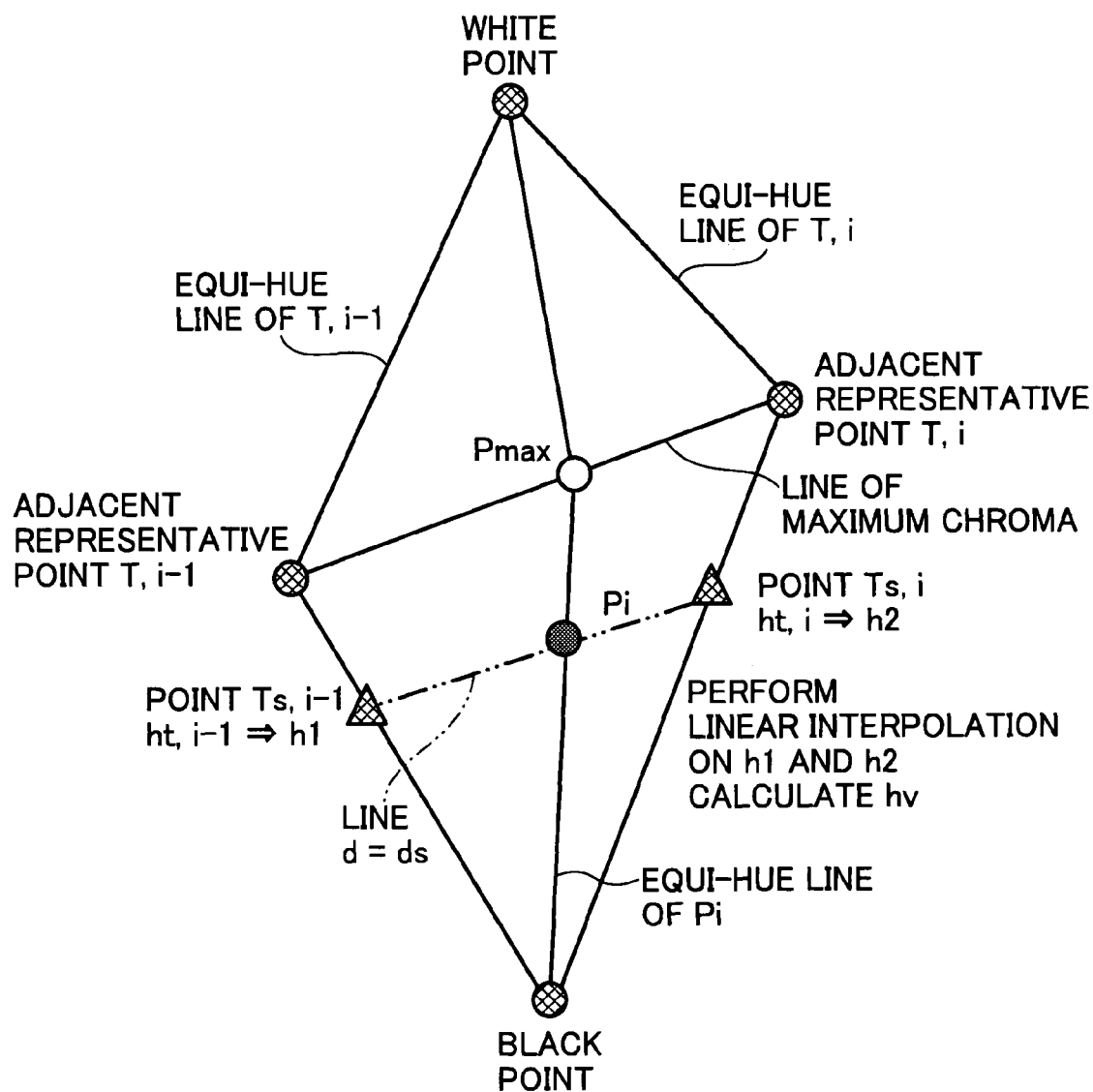
FIG. 7 is a diagram for explaining hue correction according to a first embodiment.
Figure 8:
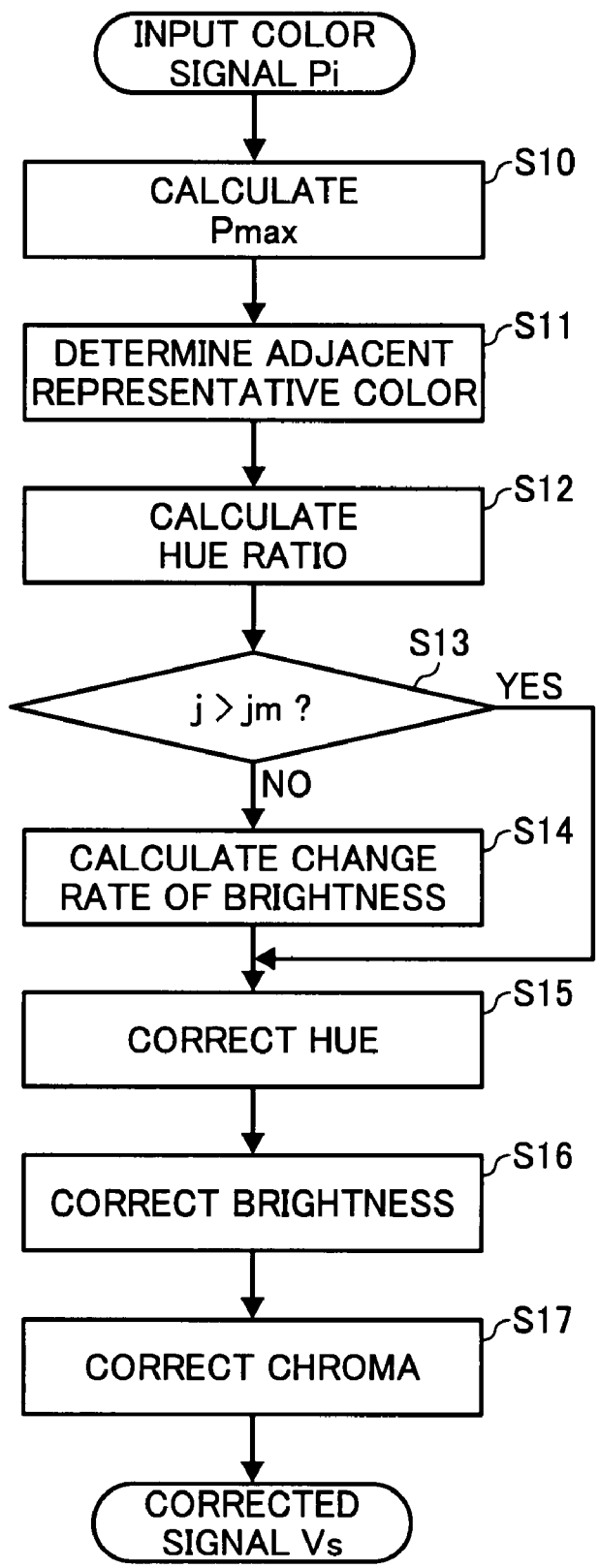
FIG. 8 is a flowchart of an input signal correction according to the first embodiment.

The input signal correcting unit 14 corrects the hue, brightness, and chroma of the input signal Pi which is transmitted from the color space converting unit 103 based on the hue correction table and the information on the corresponding point. The process by the input signal correcting unit 14 will be described in detail below with reference to FIGS. 7 and 8. FIG. 7 is a diagram employed to describe a manner of hue correction according to the first embodiment. FIG. 8 is a flowchart of input signal correction.

The input signal is represented as Pi(j,c,h), and the corresponding point corresponding to the representative point T(i) is represented as M(i). Further, there are six representative points, R, G, B, C, M, and Y, and $1 \leq i \leq 6$. Further, the hue correction table corresponding to the representative point T(i) is represented as Table(i).

Firstly, a point Pmax(jm,cm,hm) at which the chroma is maximum within the equi-hue plane including the input signal Pi is found within the input color space in step S10. Specifically, a table describing the maximum chroma color data for each hue is previously prepared. The maximum chroma color data Pmax corresponding to the hue h of the input color signal Pi is read out from the prepared table. When the maximum chroma color data Pmax corresponding to the hue h is not included in the prepared table, the data near the hue h is read out and interpolation operation is performed, so that an approximate calculation can be carried out.

Then, two representative colors (adjacent representative colors) whose hue is adjacent to the hue of Pi are found in a step S11. The adjacent representative color can be easily found by: finding each of $$\text{Diff}\_h(i-1)=hs-ht(i-1), \text{ and}$$

$$\text{Diff}\_h(i)=hs-ht(i),$$

where hs is the hue of the input signal Pi, ht(i−1) is the hue of the representative point T(i−1), and ht(i) is the hue of the representative point T(i); and checking whether the sign of Diff_h(i−1) is inverse to the sign of Diff_h(i).

After the adjacent representative points T1 and T2 are found, the ratio of internal division r of the hue is calculated in step S12. The ratio of internal division r can be found as:

r=(difference between the hue of *Pi* and the hue of T(i−1))/(difference between the hue of T(i) and the hue of T(i−1)).

Then, the change rate ds of brightness of Pi is calculated. Firstly, the brightness of the input signal Pi and the brightness of Pmax are compared in a step S13. When the brightness j of Pi is lower than the brightness jm of Pmax, the process proceeds to S14 and the amount of hue correction is found based on the hue correction table. In step S14, the change rate ds of brightness of Pi corresponding to the line connecting Pmax and black is calculated. Here, $$ds=j/jm$$

is satisfied. On the other hand, when the brightness j of Pi is determined to be higher than the brightness jm of Pmax in step S13, ds is set to be equal to 1.

In step S15, the corrected hue value corresponding to Pi is calculated based on the change rate ds of brightness. Firstly, hue correction factors hr1 and hr2 matching with the change rate ds of brightness are read out from the hue correction table which is defined corresponding to the equi-hue lines connecting black and two respective representative colors corresponding to the adjacent representative colors. Since hr1 and hr2 are the hue correction factors for the points Ts(i−1) and Ts(i) shown in FIG. 7, respectively, the corrected hue h1 and h2 of Ts(i−1) and Ts(i) can be calculated as follows:

$$h1=hr1*(jm1-jt1)+jt1,$$

$$h2=hr2*(jm2-jt2)+jt2$$

where jt1 and jt2 represent the brightness of respective adjacent representative points T1 and T2, and jm1 and jm2 are brightness of corresponding colors of the adjacent representative points. When the h1 and h2 are subjected to the linear interpolation based on a following equation with the use of the rate r of internal division of the hue, the corrected hue hv of Pi is found:

$$hv=r*(h1-h2)+h2.$$

When the corrected hue value is determined according to the process described above, the correction of brightness and chroma is performed in steps S16 and S17, respectively. The brightness of the adjacent representative points are represented as jt1 and jt2. The brightness of the corresponding colors of the adjacent representative points are represented as jm1 and jm2. Corrected brightness jv of Pi can be found as follows:

$$jv=(jm2-jm1)*(j-jt1)/(jt2-jt1)+jm1.$$

When the input color signal is an sRGB signal, processing is often performed to stress the chroma of the cyan hue or the blue hue so that the color reproduction range which is wider than the input gamut is efficiently utilized. In such a case, it may be sufficient if the chroma of the corresponding color for the representative color is stressed in a specific hue. The corrected chroma cv can be found as follows:

$$cv=c*(r*(cr1-cr2)+cr2).$$

Here, cr1 is a rate of chroma enhancement for the representative color T1, and cr2 is a rate of chroma enhancement for the representative color T2. The processing in steps S16 and S17 are not always necessary. It is possible to correct the hue alone without changing the brightness j and the chroma c of Pi.

(5) Mapping Processing Unit 15

The mapping processing unit 15 converts the corrected color signal Pv(jv,cv,hv) supplied from the input signal correcting unit 14 into the color signal Po(j',c',h') that can be output, referring to the gamut data 16 of the output device. Since h' coincides with hv which is found by the input signal correcting unit 14, the mapping processing unit 15 only needs to find j' and c'. If Pv and Po are assumed to be of the same hue tentatively, the mapping processing can be replaced with a two-dimensional conversion from Pv(jv,cv) to Po(j',c'). If the input signal correcting unit 14 has performed the brightness correction, however, the mapped color corresponding to the representative color can be made to coincide with the corresponding color if the gamut compression is performed with the fixed brightness. Therefore, in the mapping processing of the invention, only the chroma is compressed in the mapping processing with the brightness set to a fixed value. However, the gamut processing within the same hue plane can be adopted according to the proposal in Japanese Patent Application Laid-Open Nos. H9-168097 and H9-18727 as it is.

Other than the manner as described above where only the out-of-gamut colors are mapped to the gamut boundary plane, a manner called perceptual matching may be employed, according to which an entire color space is equally subjected to compression mapping so that the gradation of input colors outside the gamut of the output device is maintained.

When the output color signal (j',c',h') is found according to the gamut conversion described above, the color space converting unit 104 performs a conversion to the color signal for the output device, and printing is performed. Thus, the color reproduction with little color change and excellent hue continuity can be realized.

In the example described above, the correction of the input color signal and the mapping processing are performed every time the input color signal is calculated. However, it is also possible to find an output CMY(K) signal value corresponding to a predetermined RGB value in the RGB space based on the manner described above, store the result in a three-dimensional look up table, read out plural output values from the three-dimensional look up table at a time of color conversion to perform interpolation operation.

Second Embodiment

Example of Use of Hue Correction Table for Equi-Hue Line Connecting White and Representative Color In the first embodiment, the hue correction table is set corresponding to the equi-hue line from black to the representative color. In the second embodiment, the hue correction table is set corresponding to the equi-hue line from black to the representative color and an equi-hue line from white to the representative color. Further, in the first embodiment, the equi-hue line is defined in the CIECAM02 space which is device independent. In applications employed in the personal computer (PC), color is mostly designated based on the RGB space. Therefore, when the equi-hue line is defined in the device-independent color space, the color control sometimes cannot be performed in a desirable manner. For example, though the gradation ranging from blue to black is frequently used in presentation documents, such a gradation does not match with an equi-hue line in the CIECAM02 space. Therefore, in the second embodiment, hue lines are set in an HLS space which is a device-dependent signal so that an amount of hue correction for colors designated in the RGB space can be easily controlled.

Figure 9:
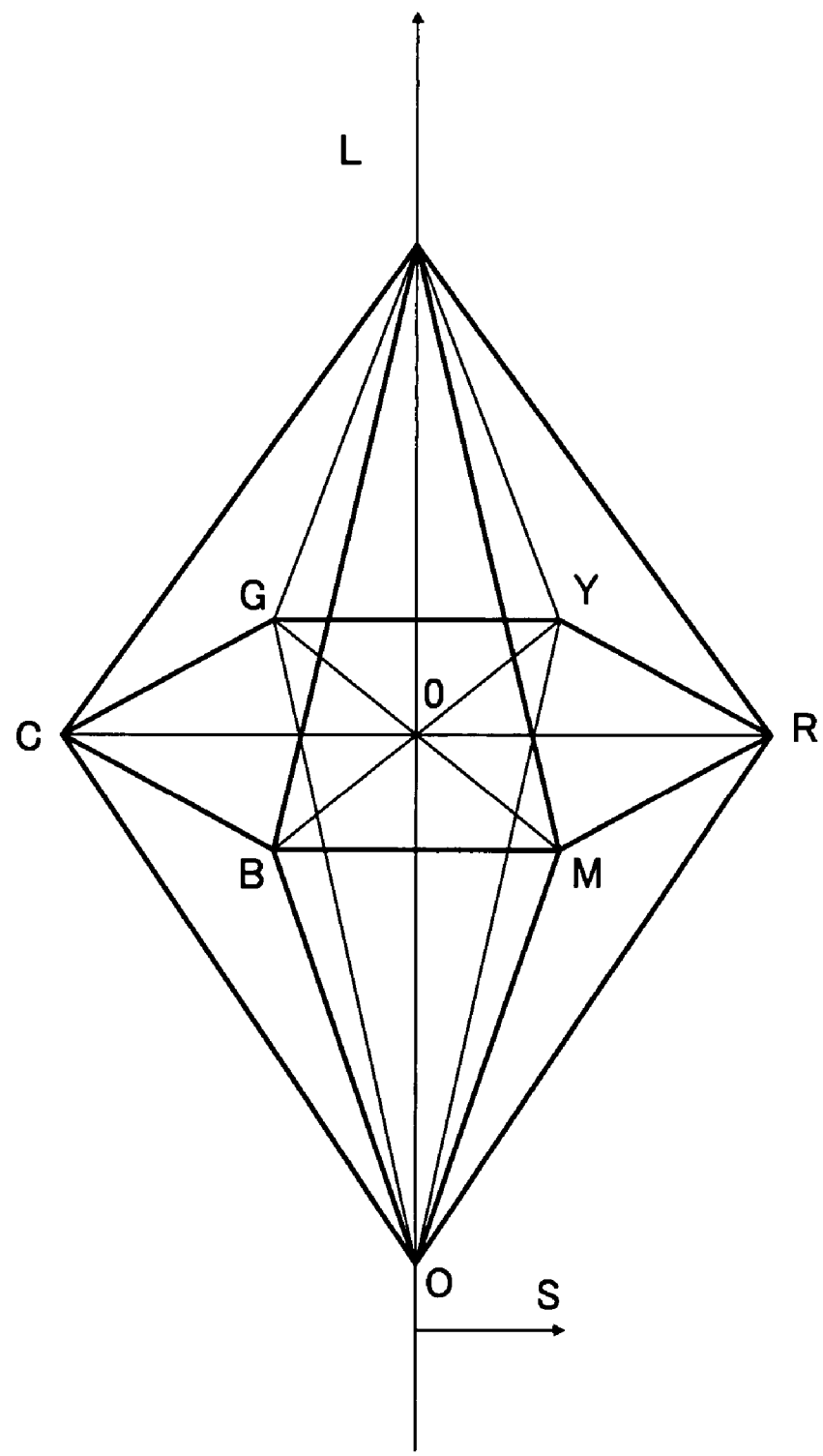
FIG. 9 is a diagram for explaining an HLS color space.
Figures 11, 12:
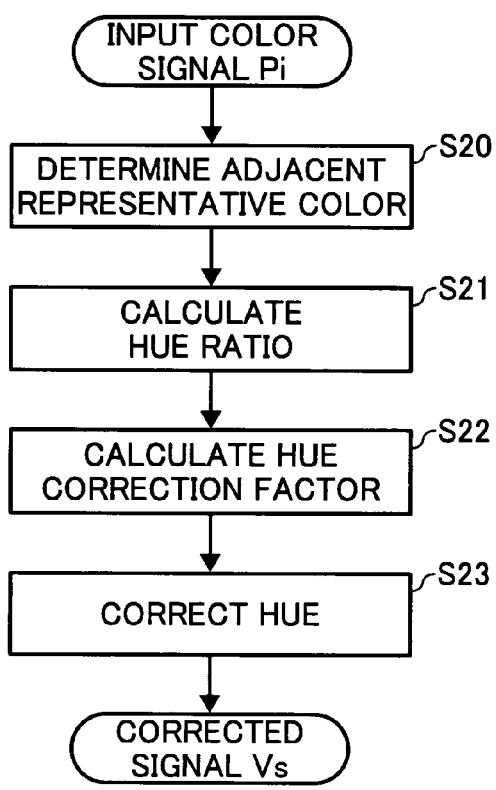
FIG. 11 shows conversion equations for conversion from an RGB signal to an HSL signal.
FIG. 12 is a flowchart of input signal correction according to a second embodiment.

Firstly, the HLS space will be described. HLS color model employed in the second embodiment is a variation of an RGB color solid. As shown in FIG. 9, the HLS color model forms a partial space of a double six-sided pyramid shape. The hue is indicated by an angle about a vertical axis of the double six-sided pyramid. When certain hue is represented by a certain angle about the vertical axis, the hue of the complementary color thereof is represented by an opposite angle thereof. The saturation S is represented by a radial distance from the vertical axis varying from 0 (axis) to 1 (surface) (for gray, S=0). With respect to the lightness L, for black (a lower apex of the double six-sided pyramid) L=0, and for white (an upper apex of the double six-sided pyramid) L=1. Further, for a color with the maximum saturation, S=1 and L=0.5. Specific conversion is performed based on conversion equations shown in FIG. 11.

Configuration of elements performing the color range mapping using the HLS space is the same as the configuration shown in FIG. 2, and the description thereof will not be repeated. It should be noted, however, that the color space converting unit 103 of FIG. 1 converts the input color signal into a signal of the HLS space and sends the resulting signal to the color range mapping unit 105, since the input to the color range mapping unit 105 should be an HLS signal.

Processing units configuring the color range mapping unit 105 according to the second embodiment will be described in detail below.

(1) Representative Color Setting Unit 11

The representative color setting unit 11 sets the representative color T(i), for which a particular stress is placed on the color reproduction, in the HLS signal value. For example, when the cyan color is designated as the representative color, h=180, l=0.5, and s=1.0. When the saturated colors of the primary and the secondary colors of R, G, B, C, M, and Y that are frequently used in business documents are to be used as representative colors, l=0.5 and s=1.0 for all colors and only the value of the hue h is different for each color.

(2) Corresponding Color Determining Unit 12

When the representative color is determined, the corresponding color determining unit 12 determines the corresponding color M(i) corresponding to the representative color T(i). However, when the Euclidean distance in the HLS space is employed for determining the corresponding color, the color difference does not match with the perceptive color difference. Therefore, the corresponding color M(i) is set manually. Since the designation of a color which is reproducible in the printer as the corresponding color requires cumbersome operations, it is sufficient if only the hue of the corresponding color M(i) is set.

(3) Hue Table Setting Unit 13

Figure 10:
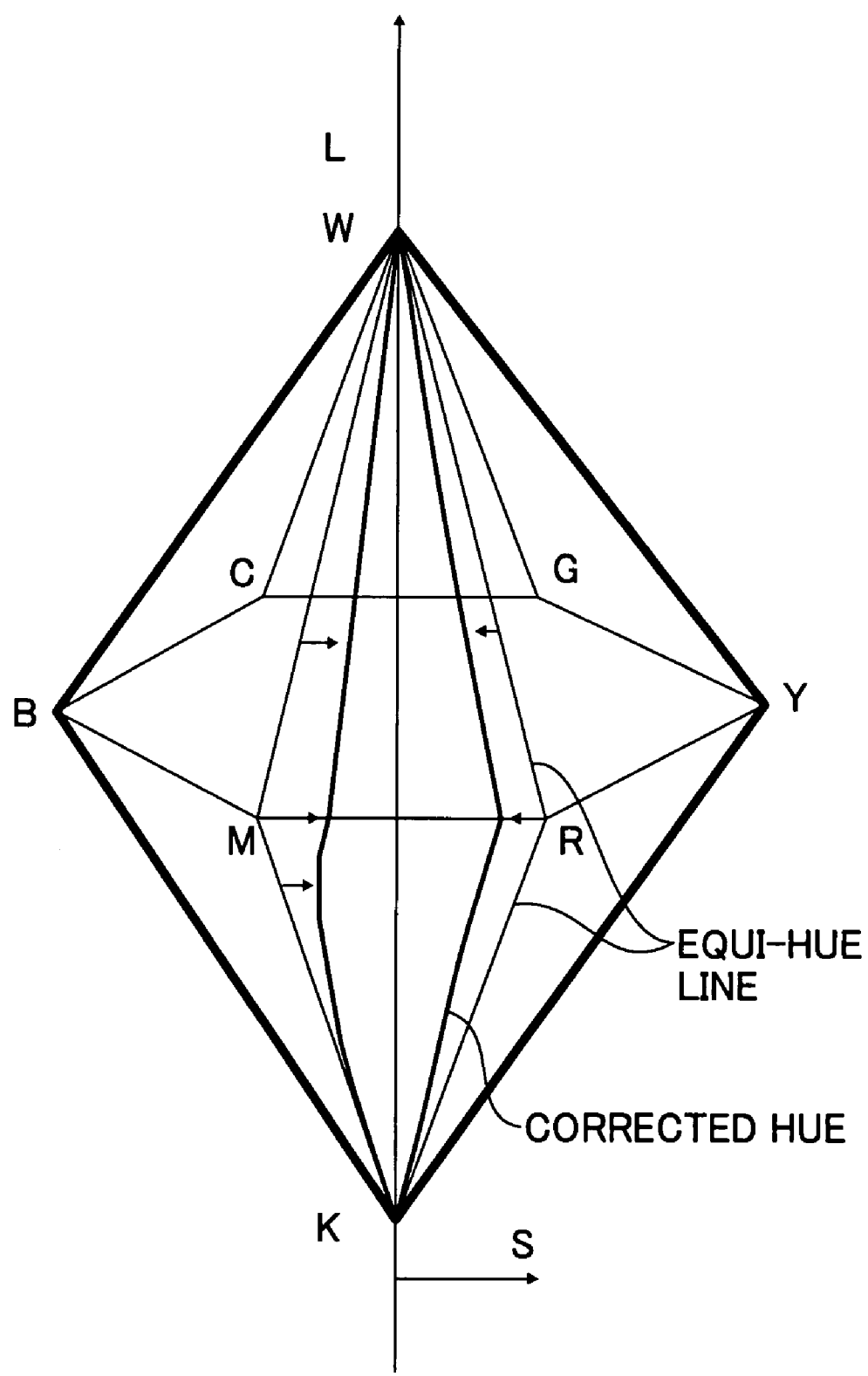
FIG. 10 is a diagram for explaining hue change based on a hue correction table.

The hue table setting unit 13 sets the hue correction table in such a manner that the hue successively changes corresponding to the equi-hue line from the representative color T(i) to black and the equi-hue line from the representative color T(i) to white. FIG. 10 is a conceptual diagram of the equi-hue line according to the second embodiment. In FIG. 10, the equi-hue line running on R (representative color) is corrected to the hue biased to M (representative color), while the equi-hue line running on M is corrected to the hue biased to R. Further, the hue placed between the W and R, or W and M are also shifted slightly. Here, the equi-hue line is a line which is placed in the HSL space and on which the hue H is fixed. Specifically, a line expressed by S=1 and 0.5≦L≦1.0 corresponds to a line from the representative color to white, while a line expressed by S=1 and 0.0≦L≦0.5 corresponds to a line from black to the representative color. Thus, when the equi-hue line is defined in the HLS space, the hue correction table can be set corresponding to a line matching with the equi-hue line (white—cyan—black) in the RGB space. Therefore, direct color control can be performed on gradation frequently used in the application.

Further, since the brightness of the color with the maximum chroma is fixed within the HSL space, the hue correction table can be set as the hue correction factor corresponding to the lightness L of the HSL signal. Similarly to the first embodiment, a ratio of internal division of the hue of the representative color and the hue of the corresponding color can be used as the hue correction factor.

(4) Input Signal Correcting Unit 14

The input signal correcting unit 14 corrects only the hue of the input signal Pi which is transmitted from the color space converting unit 103 based on the above-mentioned hue correction table and the information on the corresponding point. The operation of the input signal correcting unit 14 will be described in detail below with reference to the flowchart of FIG. 12.

The input signal is represented as Pi(js,cs,hs), and the corresponding point of the representative point T(i) is represented as M(i). It is assumed that there are six representative points, R, G, B, C, M, and Y, and 1≦i≦6. Further, the hue correction table corresponding to the representative point T(i) is represented as H_table(i).

In step S20, two representative points (adjacent representative points) whose hue is adjacent to the hue of Pi are found. Specifically, Diff_h(i−1) and Diff_h(i) are found; where $$\text{Diff\_}h(i-1)=hs-ht(i-1) \text{ and}$$

$$\text{Diff\_}h(i)=hs-ht(i),$$

where hs is the hue of Pi, ht(i−1) is the hue of the representative point T(i−1), and ht(i) is the hue of the representative point T(i). Then, it is determined whether Diff_h(i−1) and Diff_h(i) have opposite signs. Thus, the adjacent representative points can be easily found.

After the adjacent representative points are found, the ratio r of internal division of the hue is calculated in step S21. The ratio r of internal division is found based on:

$$r=(\text{difference in hue of } Pi \text{ and } T(i-1))/(\text{difference in hue of } T(i) \text{ and } T(i-1)).$$

Then, the corrected value of the hue for Pi is calculated based on the lightness l of Pi in step S22. Firstly, the correction factors hr1 and hr2 that match with the lightness l are read out from the hue correction table which is defined for the equi-hue lines corresponding to two representative colors that correspond to the adjacent representative points. When the lightness l is not less than 0.5, the hue correction table set for white to the representative color is employed, while when the lightness l is less than 0.5, the hue correction table set to the representative color to black is employed. Then, the hue correction value for the adjacent hue is found based on hr1 and hr2.

$$h1=hr1*(jm1-jt1)+jt1,$$

$$h2=hr2*(jm2-jt2)+jt2.$$

Here, jt1 and jt2 represent the lightness of the respective adjacent representative points T1 and T2, and jm1 and jm2 represent the lightness of the respective corresponding points of the adjacent representative points.

Finally, linear interpolation is performed on h1 and h2 with the ratio r of internal division of the hue mentioned above in step S23. Thus, the corrected hue hv of Pi is found. Here, the following expression is satisfied:

$$hv=r*(h1-h2)+h2.$$

In the second embodiment, the hue correction table is set for a line from white to the representative color. Therefore, the second embodiment is advantageous in such a case where it is desirable to reproduce all the colors ranging from white to yellow in the RGB space in yellow of the output device, for example.

(5) Mapping Processing Unit 15

The mapping processing unit 15 converts the corrected color signal Pv(jv,cv,hv) supplied from the input signal correcting unit 24 into a color signal based on the CIECAM02 space. Then, the j,c,h signal obtained as a result of conversion is converted into the color signal Po(j',c',h') in an outputtable form with reference to the gamut data 16 of the output device. A specific manner of gamut compression is similar to the gamut compression according to the first embodiment.

When the output color signal (j',c',h') is found as a result of the gamut conversion mentioned above, the color space converting unit 104 converts the output color signal (j',c',h') into a color signal for the output device, and the data is printed out. Thus, the color reproduction can be realized with little color change and excellent gradation continuity.

Third Embodiment

In the embodiments described above, the hue control table is set corresponding to the hue of the corresponding color and the hue of the representative color. When the hue control table is set based only on the hue, the resulting hue correction table does not properly reflect the relative relation between the equi-hue line and the gamut of the output device. In the third embodiment, a manner of setting an appropriate hue correction table independent of the gamut shape of the output device will be described with reference to FIG. 13.

Figure 13:
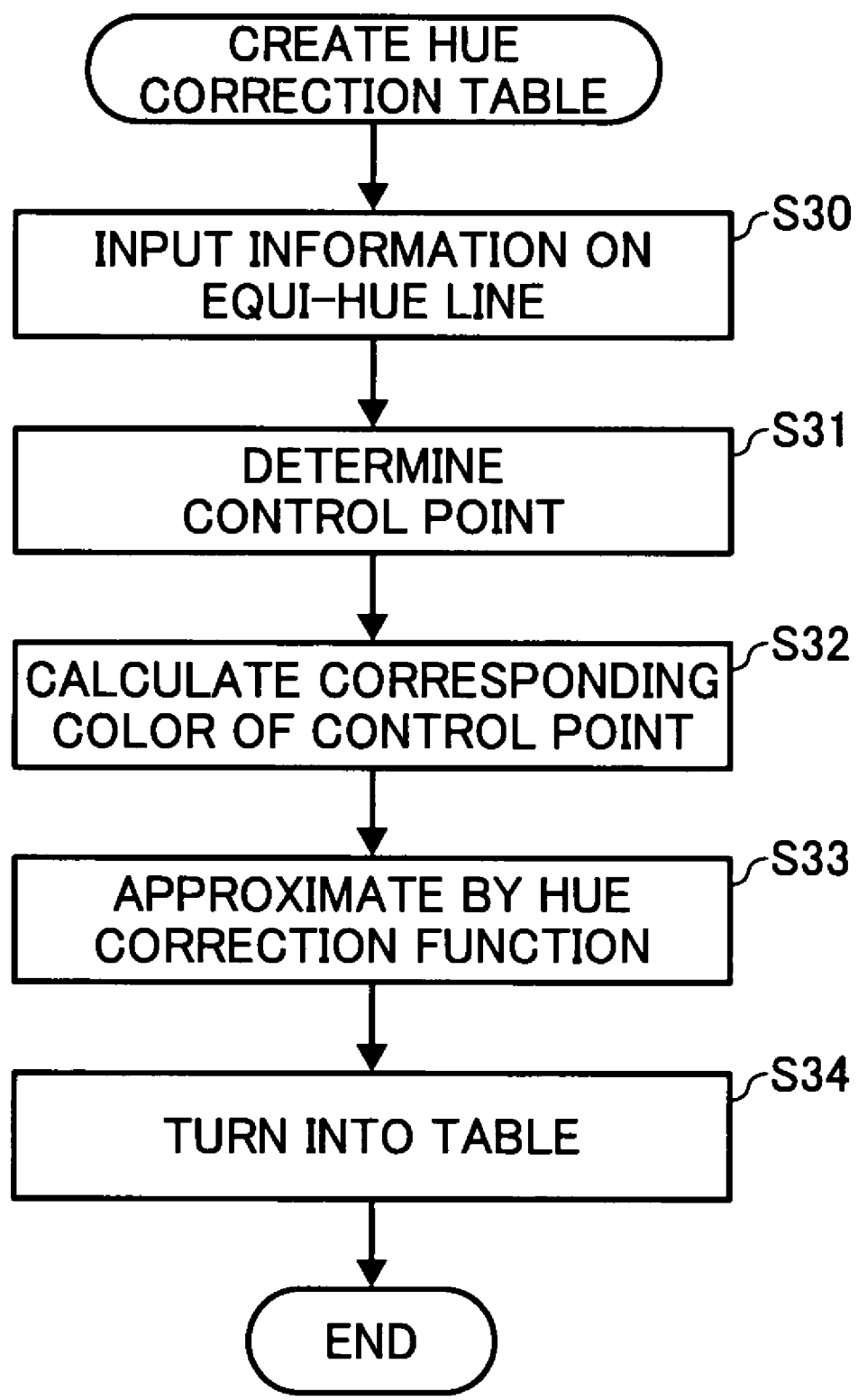
FIG. 13 is a flowchart of hue correction table creation according to a third embodiment.

FIG. 13 is a flowchart of hue correction table creation according to the third embodiment. Firstly, an equi-hue line for which the hue correction table is to be created is set in step S30. Information on (jt,ct,ht) value, i.e., the brightness, chroma, and hue of the representative color is sufficient as the equi-hue line information.

Figure 14:
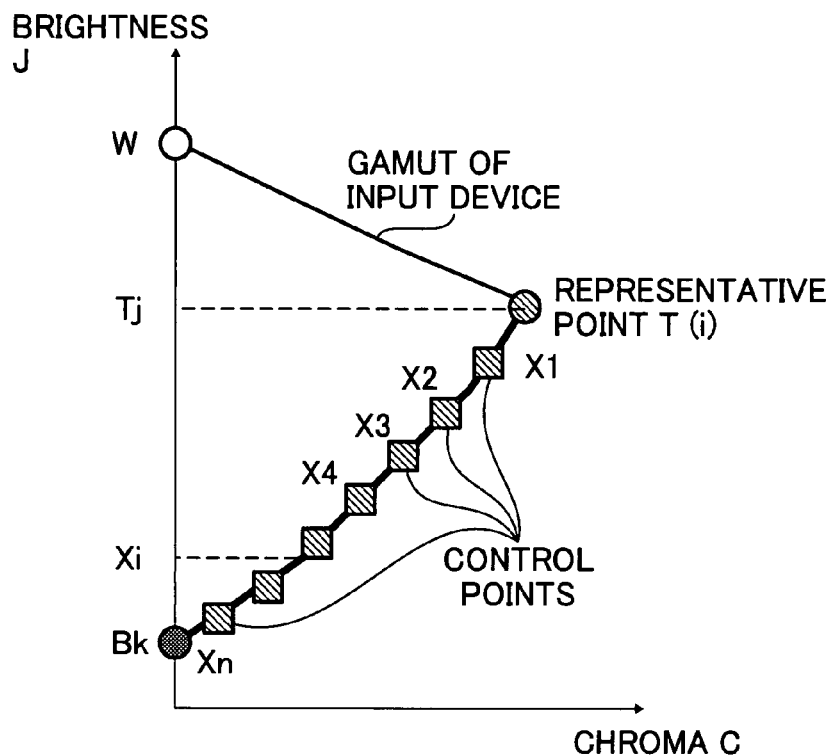
FIG. 14 is a graph of examples of a control point according to the third embodiment.

Then, a control point xi(jxi,cxi,hx) is set in step S31. There are plural control points lining up on the equi-hue line at substantially equal intervals as shown in FIG. 14. There is no particular limitation on the number of the control points.

Corresponding color yi(jyi,cyi,hyi) for each control point is calculated in step S32. The corresponding color may be determined so that the color difference between the representative color and the corresponding color is minimum similarly to the first embodiment. It is more desirable, however, that the color reproduction evaluation equation which is set based on visual experiments be employed.

After the corresponding color is found for every control point, a change rate of brightness and a hue correction factor are calculated for each control point in step S33 for the creation of a hue correction function. Here, the following expressions are satisfied:

change rate $d$ of brightness of control point=$jxi/jt$, hue correction factor $hrx$ of control point=$(hyi-hx)/(ht-hx)$.

Figure 15:
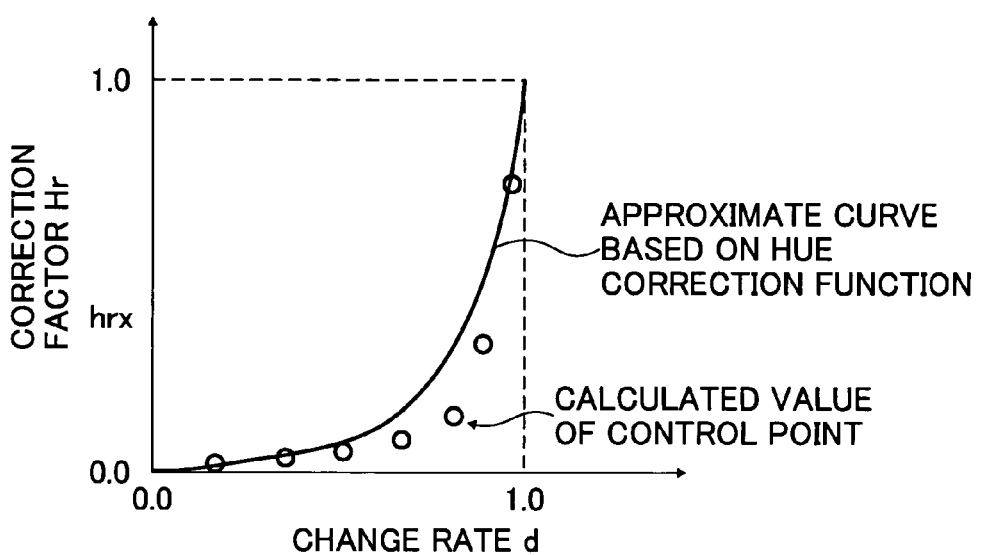
FIG. 15 is a graph for explaining a hue correction function according to the third embodiment.

Examples of the change rate of brightness and the hue correction factor calculated as described above are shown in FIG. 15. In FIG. 15, white circles represent plots corresponding to the controls points. The hue correction factors found for the respective control points do not always change successively. For example, in the case of the cyan hue, the hue correction factor tends to make a discontinuous change at control points that are located on the boundary of the gamut of the output device. To prevent a sudden hue change, white circles of FIG. 15 are approximated to a curve based on the hue correction function. The white circles of FIG. 15 can be approximated to a smooth curve with the use of n-th expression or an exponential function as the hue correction function, for example.

When the hue correction function is found, the predetermined change rate of brightness is substituted into the hue correction function, the corrected hue value is calculated, and the hue correction table is created in step S34.

In the above-described manner, the color reproduction can be performed with the resulting colors close to the expected colors, independent of the relation between the equi-hue line and the gamut shape of the output device.

Fourth Embodiment

In the above-described embodiment, the color correction is performed also to a color signal of a low chroma. A fourth embodiment, in which the color signals which are reproducible by the printer are left intact without correction as far as possible, will be described with reference to FIGS. 16 and 17.

Figure 16:
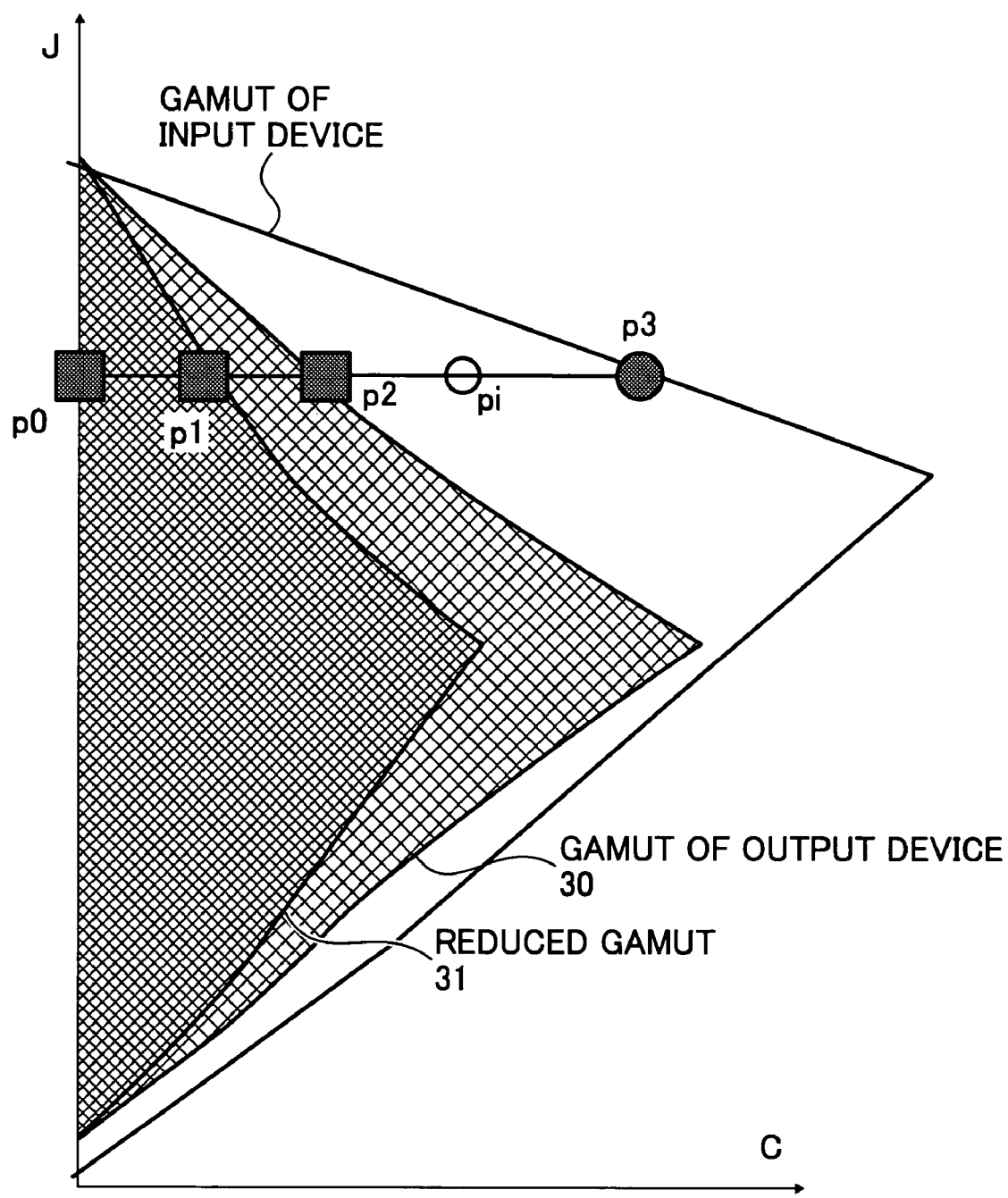
FIG. 16 is a graph for explaining color range mapping according to a fourth embodiment.

FIG. 16 shows a gamut of an input color space, a gamut 30 of the output device, and a gamut 31 which is a reduced version of the gamut of the output device. Further, the input color signal Pi is indicated by a white circle. Points on the boundaries of the respective gamuts where the brightness and the hue match with those of the input color signal are indicated as points P1, P2, and P3 (P0 represents a point on the achromatic axis).

Firstly, a reduction ratio of the gamut is set to determine a color reproduction range in step S40. The input color signals fall within the determined color reproduction range will not be corrected. The color reproduction range, in which no correction is performed, may be set to any range as far as the set range is smaller than the gamut of the output device. In the fourth embodiment, the reduced gamut 31 is defined based on the product of the chroma of the gamut 30 of the output device with a predetermined reduction ratio kr for simplicity.

In step S41, chroma values of P1 and P3 are found. As described above, the maximum chroma Cmax corresponding to the hue H and the brightness J is described in the gamut data. Therefore, when the maximum chroma Cmax in the input color space corresponding to the brightness and the hue of the input color signal Pi is read out, chroma C3 of the point P3 can be found. Similarly, chroma C2 of the point P2 can be found with reference to the gamut data 16 of the output device based on the brightness and the hue of the input color signal Pi, and chroma C1 of the point P1 can be found by multiplying the chroma value of P2 with the above-mentioned reduction ratio kr.

When the chroma values of P1 and P3 are found, a chroma ratio sr of the input color signal Pi is found in step S42. The value of sr is found based on a following expression:

$sr=(Ci-C1)/(C3-C1)$.

Here, Ci represents a chroma value of the input signal Pi.

In step S43, the hue correction factor of the input signal Pi is calculated. When the hue correction factor of P3 is represented as hr, the hue correction factor of the input signal Pi can be found as follows:

hue correction factor of input signal $Pi=hr*sr$.

The hue correction factor of P3 is found according to the manner described above in relation to the first and the second embodiments. When the hue correction factor is found, the hue of P3 and the hue of the corresponding color of P3 are divided internally similarly to the first embodiment, whereby the hue of Pi is calculated in step S44. When the hue correction factor is changed according to the chroma ratio, the faithful color reproduction can be realized within the reduced gamut of the output device with the use of gradually varying hue correction factor.

In the embodiment described above, the amount of hue correction is controlled in direct proportion to the chroma ratio. The manner of control, however, is not limited thereto, and the correction may be performed in such a manner that the corrected amounts of brightness and hue have a nonlinear characteristic.

Fifth Embodiment

FIG. 18 is a block diagram of a variation of the image processing system shown in FIG. 1. In the variation of FIG. 18, the system is realized with software. A computer 200 includes a program reader 203, a CPU 204 which controls the entire system, a RAM 205 which is employed as a work area or the like of the CPU 204, a ROM 206 in which a control program or the like of the CPU 204 is stored, a hard disk 207, a NIC 208, a mouse 209, a keyboard 210, a display 201 which serves to display image data, and an image forming device 202 such as a color printer. The image processing system may be realized with a work station, a personal computer, or the like.

The CPU 204, the ROM 206, the RAM 205, and the hard disk 207 have the same functions as those of the computer 100 shown in FIG. 1. The functions of the color space converting units 103 and 104, and the color range mapping unit 105 shown in FIG. 1 can be incorporated in the CPU 204. In brief, the function of the image processing apparatus according to the embodiments of the present invention can be implemented by the CPU 204.

The function as the image processing apparatus as in the CPU 204 may be provided in a form of a software package, in particular, in a form of an information recording medium such as a CD-ROM. Therefore, in an example shown in FIG. 18, a medium drive (not shown) is provided so that the medium drive drives the information recording medium when it is set.

As can be seen from the foregoing, the apparatus and the method for image processing according to the present invention can be implemented in a configuration in which a program recorded in an information recording medium such as a CD-ROM is read out and loaded into a general computing system provided with a display and the like, and a microprocessor in the general computing system executes the color space conversion processing and the gamut conversion processing. In this case, the program for executing the color space conversion processing and the gamut conversion processing according to the present invention, i.e., a program employed in a hardware system, is provided in a state recorded in a recording medium. The information recording medium in which the program and the like is recorded is not limited to the CD-ROM, and can be a ROM, RAM, flexible disk, memory card, and the like. The program recorded in the recording medium is installed into a storage unit embedded in the hardware system, for example, installed into the hard disk 207. Then, the execution of the program is allowed for the execution of the color space conversion processing and the gamut conversion processing.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus which converts an input color signal into a color signal which falls within a color reproduction range of an image output device, the image processing apparatus comprising:

a representative color setting unit that sets plural representative colors;

a first hue setting unit that sets corrected hue for each point in an input color space on a first equi-hue line connecting the representative color and black such that the corrected hue continuously changes along the first equi-hue line;

a second hue setting unit that is configured to set corrected hue for each point in an input color space on a second equi-hue line connecting the representative color and white such that the corrected hue continuously changes along the second equi-hue line;

a hue correcting unit that corrects hue of the input color signal referring to the first and the second hue setting units; and a mapping unit that maps the input color signal after whose hue is corrected by the hue correcting unit to a color signal within a color range of the image output device, wherein the first hue setting unit sets corrected hue using a hue correction table in which a hue correction factor varies nonlinearly with respect to a change rate of brightness, the hue correction factor indicating a degree to which a hue of a representative color corresponding to each point in the in input color space on the first equi-hue line is to be changed to a hue of a respective corresponding color that is within a color range of the image output device, and wherein the second hue setting unit sets corrected hue such that the corrected hue for a representative color corresponding to each point in the input color space on the second equi-hue line is always changed to the hue of the respective corresponding color that is within a color range of the image output device.

2. The image processing apparatus according to claim 1, wherein the first hue setting unit is configured with a hue correction table for correcting hue such that the corrected hue continuously changes from hue of the representative color to hue of a corresponding color corresponding to the representative color along the first equi-hue line.

3. The image processing apparatus according to claim 2, wherein the hue correction table can be set independently for each of the representative colors.

4. The image processing apparatus according to claim 2, wherein hue for each point in the input color space on the second equi-hue line is corrected to the same hue as the hue of the corresponding color.

5. The image processing apparatus according to claim wherein the corresponding color is determined with a use of an evaluation equation based on a visual experiment.

6. The image processing apparatus according to claim 1, wherein a color range for which hue correction is not performed can be set.

7. The image processing apparatus according to claim 6, wherein the color range for which the hue correction is not performed is a range obtained by reducing the color reproduction range of the image output device.

8. The image processing apparatus according to claim 1, wherein the device-independent color space is a CIECAM02 space and the device-dependent color space is an HLS space.

9. An image processing method for converting an input color signal into a color signal which falls within a color reproduction range of an image output device, the image processing method being performed by an image processing apparatus and comprising:

setting plural representative colors;

setting a first corrected hue for each point in an input color space on a first equi-hue line connecting the representative color and black such that the first corrected hue continuously changes along the first equi-hue line;

setting a second corrected hue for each point in an input color space on a second equi-hue line connecting the representative color and white such that the first corrected hue continuously changes along the second equi-hue line;

correcting hue of the input color signal referring to the first and the second hue set; and mapping the input color signal after whose hue is corrected to a color signal within a color range of the image output device, wherein the setting the first corrected hue comprises setting corrected hue using a hue correction table in which a hue correction factor varies nonlinearly with respect to a change rate of brightness, the hue correction factor indicating a degree to which a hue of a representative color corresponding to each point in the input color space on the first equi-hue line is to be changed to a hue of a respective corresponding color that is within a color range of the image output device, and wherein the setting the second corrected hue comprises setting corrected hue such that the corrected hue for the representative color corresponding to each point in the input color space on the second equi-hue line is always changed to the hue of the respective corresponding color that is within a color range of the image output device.

10. The image processing method according to claim 9, wherein in the setting the first corrected hue, a hue correction table for correcting hue such that the first corrected hue continuously changes from hue of the representative color to hue of a corresponding color corresponding to the representative color along the first equi-hue line is employed.

11. The image processing method according to claim 10, wherein the hue correction table can be set independently for each of the representative colors.

12. The image processing method according to claim 9, wherein hue for each point in the input color space on the second equi-hue line is corrected to the same hue as the hue of the corresponding color.

13. The image processing method according to claim 9, wherein the corresponding color is determined with a use of an evaluation equation based on a visual experiment.

14. The image processing method according to claim 9, wherein a color range for which hue correction is not performed can be set.

15. The image processing method according to claim 14, wherein the color range for which the hue correction is not performed is a range obtained by reducing the color reproduction range of the image output device.

16. A computer program product comprising a non-transitory computer usable medium having computer readable program codes embodied in the medium that, when executed, cause a computer to execute the image processing method according to claim 9.

17. A non-transitory computer usable recording medium having computer readable program codes embodied therein that, when executed, cause a computer to execute the image processing method according to claim 9.

18. The image processing method according to claim 9, wherein the device-independent color space is a CIECAM02 space and the device-dependent color space is an HLS space.

* * * * *